Sept. 22, 1931.　　　L. B. GREEN　　　1,824,015
MOUNTING FOR RADIATOR SHUTTER BLADES
Filed May 11, 1931　　　3 Sheets-Sheet 1
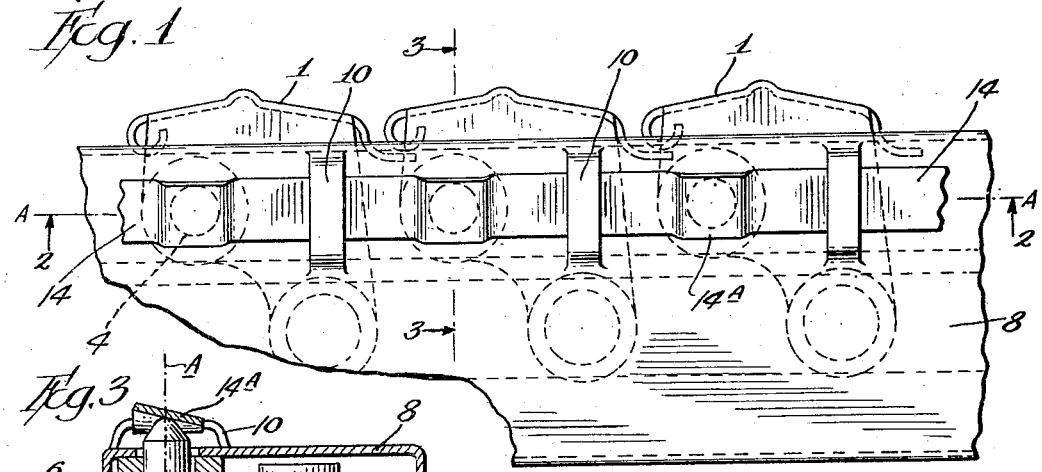
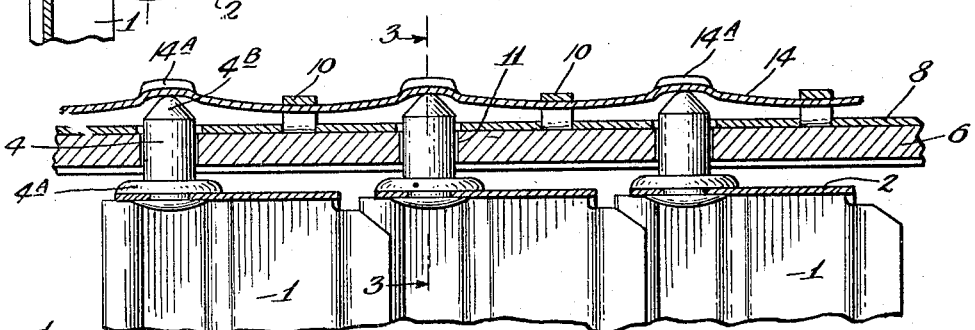
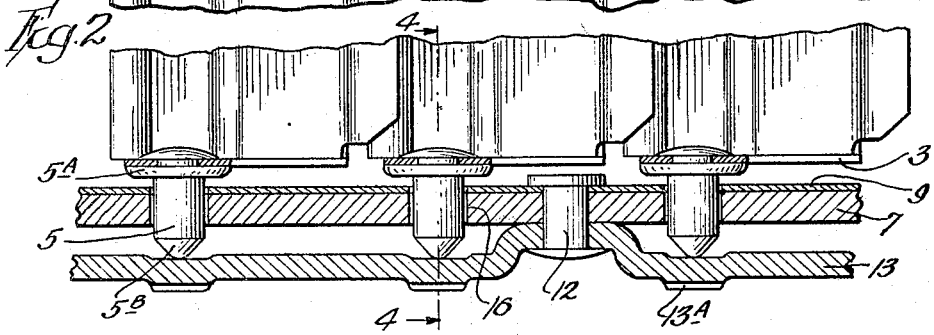
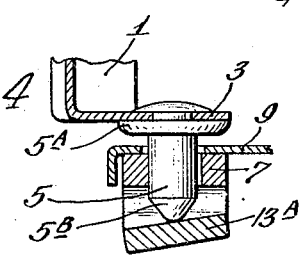
Inventor:
Lee B. Green
by Albert Scheible
Attorney

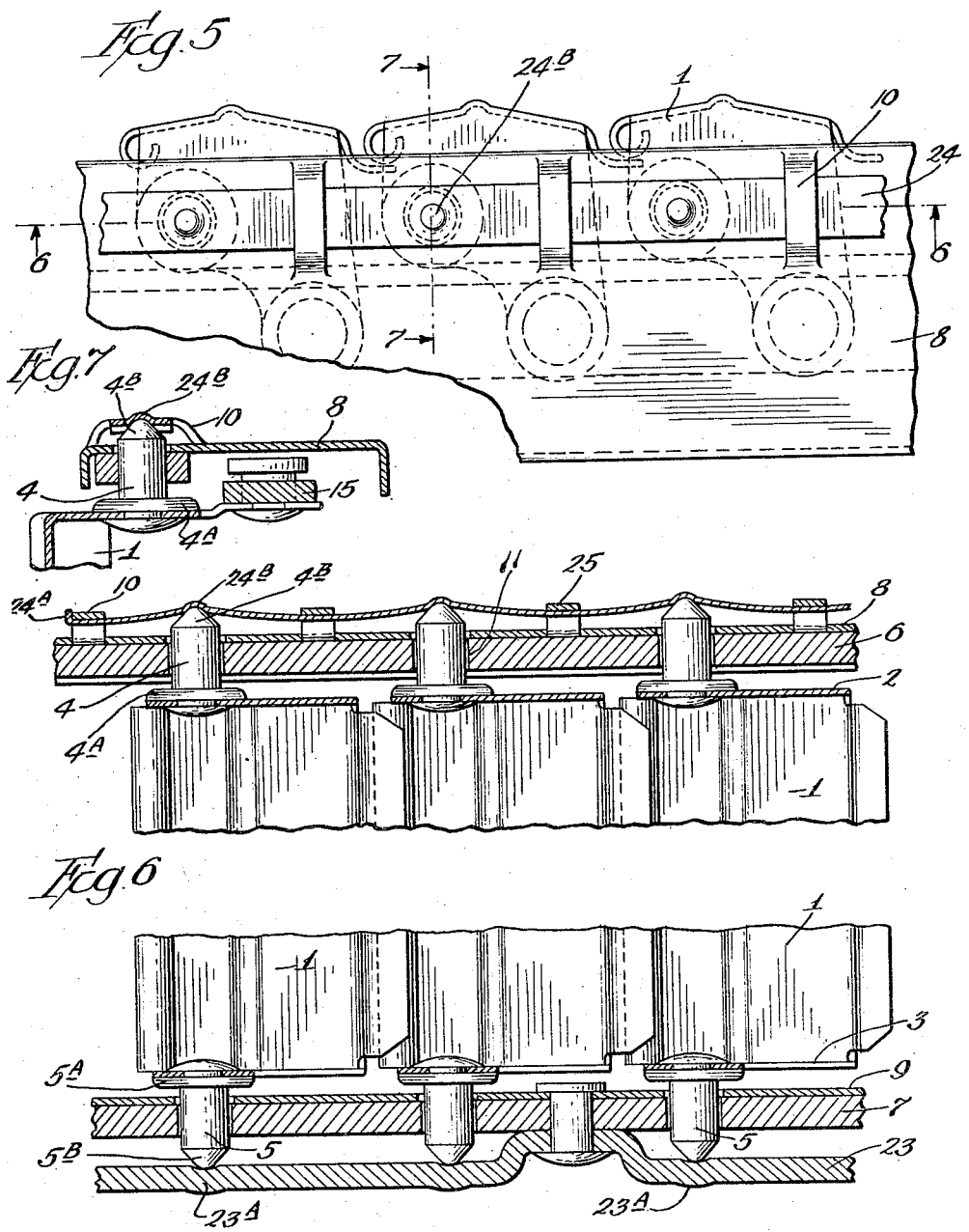

Sept. 22, 1931.      L. B. GREEN      1,824,015
MOUNTING FOR RADIATOR SHUTTER BLADES
Filed May 11, 1931      3 Sheets-Sheet 3
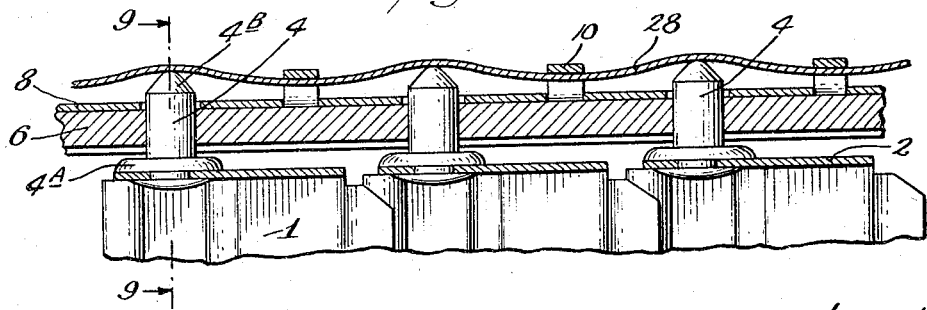
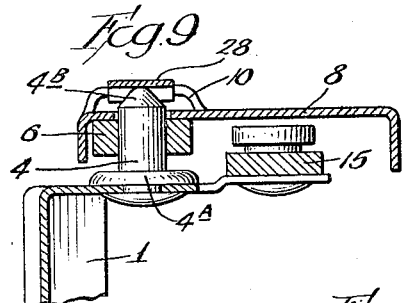
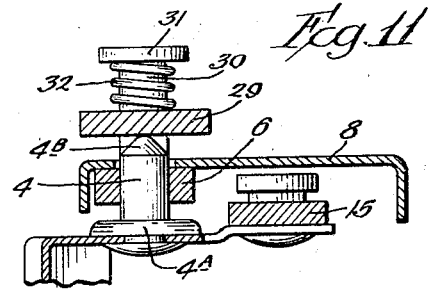
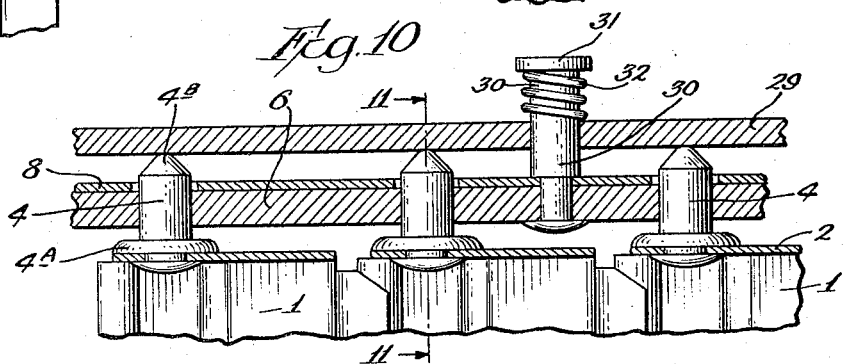
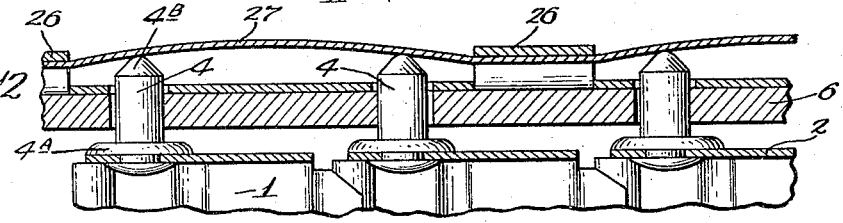
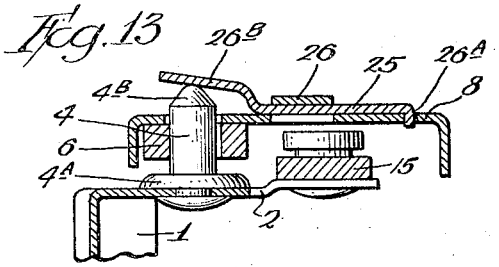
Inventor:
Lee B. Green
by Albert Scheith
Attorney Patented Sept. 22, 1931

1,824,015

UNITED STATES PATENT OFFICE

LEE B. GREEN, OF LAKEWOOD, OHIO, ASSIGNOR TO THE GLOBE MACHINE & STAMPING COMPANY, OF CLEVELAND, OHIO, A CORPORATION OF OHIO

MOUNTING FOR RADIATOR SHUTTER BLADES

Application filed May 11, 1931. Serial No. 536,473.

My invention relates to shutters having parallel pivoted blades, and in its general objects aims to provide simple and effective means for preventing a movement of the blades both longitudinally and radially of their pivot axes, and for reducing the friction between the blades and the parts which support and guide the blades.

In automobile shutters it is generally customary to employ blades formed of sheet metal and to provide substantially alined pivoting pins fastened to and projecting from the opposite ends of the blades, which pins extend through alined bearings—as for example through alined bores in two opposite members of a shutter frame. In manufacturing such shutters economically, the axes of the two pivoting pins fastened to opposite ends of the same blade do not always aline exactly with each other; and a similar lack of an exact alinement is also apt to occur as to the assumedly alined bores n the two bearing bars in which the pivoting pins at opposite ends of the blades are journaled.

In view of such variations and also because of similar variations in the diameters of the pivoting pins and of the bars in the bearing bars, it has been necessary to make the diameter of each such pin sufficiently smaller than the diameter of the bearing bore for that pin so as to allow for these common variations. As the result, these pivot pins are free to move to a limited extent in directions radial of their axes when the shutter is jarred. Moreover, since the departure from an exact alinement of the pins on adjacent blades may not be in the same direction, such bodily movements of the jarred shutter blade members are apt to be in differing directions, thereby interfering with the proper interfitting of the adjacent blade edge portions when the shutter is closed and also causing a rattling between such interengaging portions of adjacent blades.

An allied allowance for variations in the manufacture and assembling of the shutter blade members and the bearing bars has also been required in connection with the arrangements for preventing undue longitudinal movements of the shutter blade members, this term "shutter blade member" being here used as designating a shutter blade with the pivot pins fastened to its opposite ends. Each such pivoting pin usually has an outwardly facing shoulder near the adjacent end of the blade to which the pin is fastened, and the outwardly directed shoulder faces on the two pins mounted on each blade are spaced from each other by a distance approximating the spacing between the opposed faces of the two bearing bars (or opposite frame members) through which the two pins extend.

In commercial manufacturing practice, the spacing of these outward shoulder faces on different blade members may vary slightly, the spacing between the opposed faces of the two bearing bars may also vary, and these bar faces may not be disposed exactly parallel to each other. Consequently, the two bearing bars are usually mounted so that their opposed faces are spaced by a considerably greater distance than that between the oppositely directed faces of the shoulders on any one of the shutter blade members, thereby permitting a longitudinal sliding of these members and a noisy impact of the said shoulders against the bearing bars. The resulting rattling has proven particularly annoying in automobile shutters having vertical blades, since the weight of the shutter members will cause these to impact severely against the lower bearing bar after these members have been lifted off that bar by a bouncing of the car.

The use of upright blades in automobile radiator shutters has also introduced an objection which was not encountered in such radiator shutters when the blades are horizontal. With horizontally extending blade members, the weight of each such member is supported by the bores of the two bearings, and since each pivot pin engages the bore of the corresponding bearing along substantially a mere line, the friction between the pins and the bearings during the opening or closing rotational movement of the shutter blade members is quite small, particularly since the weight of such blade member is distributed between two bearings.

With a vertical shutter blade member, the entire weight of this member has to be borne by the lower bearing bar, and the engagement of the upper face of this bar by the shoulder on the lower pivoting pin is over a considerable area, thereby affording a correspondingly increased frictional resistance to rotation. As the result, a much greater amount of power is required for opening or closing shutters with vertical blades than those having horizontal blades, and this increased power interferes with the sensitive action of the automatic mechanisms now frequently employed for opening and closing automobile radiator shutters in response to variations in the temperature of the engine.

My invention aims to overcome all of the above recited objections by simple and relatively inexpensive means. More particularly, my invention aims to provide shutter assemblies embodying one or more of the following novel characteristics:

(1) A supporting of the shutter blade members substantially independent of the perforated bearing bars, leaving the bores of these bars to serve merely as guides for the assembling and as stops for limiting a possible excessive movement of shutter blade members transversely of these bores.

(2) A supporting of the shutter blade members with the oppositely directed faces of the shoulders on the pivoting pins normally freely spaced from all other parts, leaving such shoulders to serve merely as stops during the assembling of the shutter and for limiting possible excessive longitudinal movements of the shutter blade members.

(3) An effective pivoting of the shutter blade members independent of the bores through which the pivot pins on these members extend.

(4) A pivoting of the shutter blade members between two pivot members which only engage the pointed or rounded tips of the pivot pins.

(5) A yielding pressing of one such pivot member toward the other for maintaining this pivoting; and in the case of upright shutter blades, a yielding downward pressure on the upper pivoting member and a rigid supporting of the lower pivoting member.

(6) A continuous pressing of at least one pivot pin of each shutter blade member toward one side of its axis.

(7) A lateral pressure on one pivot pin by the same pivoting members which yieldingly presses that pin toward the other pivoting member.

(8) Single presser members exercising the above mentioned functions in connection with pivot pins on a plurality of shutter blades.

(9) Simple mountings to reduce the cost and facilitate the assembling, and also to permit a detaching and replacing of the presser members.

Still further and also more detailed objects of my invention will appear from the following specification and from the accompanying drawings, in which drawings Fig. 1 is a fragmentary plan view of a shutter assembly with upright blades, embodying my invention and including means for preventing longitudinal movements of the blades and for continuously urging the blades in one direction at right angles to the general plane of the shutter blades.

Fig. 2 is a vertical section taken from the rear of the shutter along the pivot axes of the blades, or along the line 2—2 of Fig. 1, with medial blade portions broken away.

Fig. 3 is a section taken along the line 3—3 of Fig. 2.

Fig. 4 is a section along the line 4—4 of Fig. 2.

Fig. 5 is a plan view of another embodiment of my invention, namely one in which the means for preventing longitudinal movements of the shutter blades also hold the pivoting axis of each blade in a fixed position.

Fig. 6 is a section along the line 6—6 of Fig. 5, with medial portions of the shutter blades broken away.

Fig. 7 is a section taken along the line 7—7 of Fig. 5.

Fig. 8 is a section similar to the upper portion of Fig. 2, showing an embodiment in which the blade-movement-preventing means operate only to prevent movements longitudinally of the blades, showing these means as engaging the upper pivot pin on each blade.

Fig. 9 is a section taken along the line 9—9 of Fig. 8.

Fig. 10 is a section similar to Fig. 8, showing a modified arrangement for the same purpose as Figs. 8 and 9.

Fig. 11 is a section taken along the line 11—11 of Fig. 10.

Fig. 12 is a section similar to Fig. 8, but showing a modified arrangement.

Fig. 13 is a fragmentary vertical section allied to that of Fig. 9, showing the use of a separately formed member, interlocked with the upper frame member, for engaging the upper pivot pin on a shutter blade.

In the shutter shown in a closed position in Figs. 1 to 4 inclusive, each upright blade 1 has at its upper end a rearwardly directed horizontal wing 2 and has at its lower end a rearwardly directed wing 3. Secured to and extending upwardly from the upper wing 2 on each shutter blade is an upper pivot pin 4 which has a flange 4A seated on the blade wing 2 and which desirably has its upper end tapering to a rounded tip 4B. Each lower blade wing 3 likewise is secured to a lower pivot pin 5 which extends downwardly and alines axially with the upper pin 4 on the same blade. This lower pin has a peripheral flange 5A bearing against the bottom of the lower blade wing 3 and has its lower end portion 5B tapered to a desirably rounded tip.

The upper pivot pins 4 all extend through upright bores in a horizontal upper bar 6 which corresponds to the upper bearing bar in the usual shutter constructions, and the lower pivot pins 5 similarly extend through upright bores in a lower bar 7 corresponding to the usual lower bearing bar in a shutter having upright blades. The two bars 6 and 7 are rigidly supported by any suitable means as for example by a channel-sectioned frame which has its upper member 8 overhanging and welded to the upper bar 6 and which has its lower member 9 overhanging and secured to the lower bar 7.

The upper frame member 8 has upwardly arched portions 10 formed from it at points intermediate of the bores 11 in the upper bar 6, through which bores the upper pivot pins 4 extend, these arched portions being disposed so that their openings aline in a common vertical plane A along the axes of all of the pins 4, and so that the top portion of each arch extends horizontally transverse of the said plane and has its lower face at less elevation than the tips of the pins 4.

Underhanging and secured to the lower bar 7 at spaced points—as shown at one point by the rivet 12—is a thrust bar 13 which has spaced portions 13A respectively underhanging the tips of the lower pivot pins 5 so as to support the shutter blade members; each of which members includes the two pins 4 and 5 together with an interposed shutter blade 1 and the flanges 2 and 3 on this blade. Each of the said portions 13A of the thrust bar 13 is formed so that its upper (or pin-engaging face) slopes in a direction at right angles to the said common plane A of the pin axes of the blades of the shutter.

Extending consecutively under the arched riser formations 10 on the upper frame member 8 and above the interposed tips 4B of the upper pivoting pins is a resilient metal strip 14, which strip has the pin-engaging portion 14A opposite each such pin tip deformed to slope in the opposite direction from the slope of the portions 13A of the thrust bar, namely upwardly forward in the illustrated embodiment. With the strip 14 initially flat except for its said pin-engaging portions 14A, the resiliency of the strip continuously tends to straighten it, thereby exerting a downward pressure on all of the upper pivot pins for yieldingly pressing all of the shutter blade members against the thrust bar 13. At the same time, the slope of these portions 14A also causes this spring pressure to press the upper pivot pins 4 forwardly (or toward the left in Fig. 3), and the inclination of the thrust bar portions likewise causes both the said spring pressure and gravity to cooperate for sliding the lower pivot pins 5 in the same direction.

Consequently, when the shutter is assembled—or at least after a few rotational movements of the shutter blade members, as effected through the usual blade-connecting bar 15—the upper and lower pivoting pins of all of the shutter blade members will engage the corresponding bores 11 and 16 in the two perforated bars 6 and 7 only along the forward portions of these bores. This contact with each pin is only along a single vertical line, and is so maintained by the spring action of the resilient strip, thereby preventing any movements of the shutter blade members in directions radial of their pivot axes. Owing to this provision, the diameters of the pivot pins need not be close approaches to those of the bores in the perforated bars through which they extend, thereby allowing considerable variations in the manufacture of these parts.

By thus providing single line engagements between each pivot pin and the bore through which it extends and by providing all of the pivot pins with substantially pointed tips respectively engaging the thrust bar 13 and the resilient strip, I greatly reduce the friction over that which occurs with the usual shutter mounting in which the large surface area of the annular bottom face of the flange 5A on each lower pin seats on a stationary part and in which each bearing pin is expected to fit the bore through which it extends. Moreover, my spring and slope arrangement automatically compensates for any wear on the parts, so that I not only prevent movements of the shutter blade members in all directions except rotationally about their axes, but also reduce the friction so that a much smaller amount of power is required for opening and closing the shutter than with the previous constructions.

In practice, the resilient strip 14 can be sufficiently flexible to allow it to be threaded consecutively through the arches 10 after the other parts are assembled; or, this strip can be inserted before the thrust bar 13 is attached to the lower perforated lower bar 9 so as to facilitate the inserting of the strip. However, I do not wish to be limited to the use of a single resilient member for exerting the desired action on a plurality of shutter blade members. Instead, I may apply this pressure to each upper pivot pin 4 by a separate spring, as illustrated for example in Fig. 13. This shows a flat strip of spring metal 25 extending under an arched riser 26 on the upper frame member 8, with the rear end portion 26A bent downward to latch in a slot in this member and with the forward part 26B sloping upwardly forward and engaging the tip of the adjacent upper pivot pin 4.

Moreover, while I have heretofore described embodiments of my invention which have proven highly satisfactory for reducing friction and preventing rattling in a shutter having vertical blades, I do not wish to be limited as to the manner in which I arrange the parts which accomplish the various purposes of my invention, since part or all of these purposes can also be accomplished by other arrangements than that illustrated in Figs. 1 to 4.

For example, Figs. 5, 6 and 7 show an embodiment in which the bottom thrust bar 23 has downwardly depressed portions 23A respectively opposite the tip of each lower pivot pin 5, so that the tapering tip 5B of each such pin seats in a depression which prevents that tip from shifting in the general plane of the shutter. The resilient strip (or "hold-down" member) 24 in this case is anchored at each end, as by providing each end thereof with a hook tip 24A bearing against the outward edge of one of the endmost arch formations 10, and this strip has dome-like portions 24B (Fig. 7) respectively engaging the pointed tips 4B of the upper pivoting pins. With the thrust bar properly positioned for holding its depressions 23A respectively coaxial with the lower pivot pins, and with the resilient strip 24 guided laterally by the riser arches 10 to hold its formations 24B also in alinement with the pivot axes of the shutter blade members, each of these members will be held against movements both radially of its pivot axis and longitudinally of its shutter blades, thereby preventing any rattling and also reducing friction. When the parts are suitably proportioned, each pivot pin may be entirely out of contact with the bore 11 through which it extends, so that these bores serve only as guides for facilitating the assembling of the shutter.

I also do not wish to be limited to arrangements in which the lateral component of the pressure exerted on a pivot pin is directed at right angles to the general plane of the shutter. For example, Fig. 12 shows an upper portion of a shutter in which two upper pins 4 extend between two consecutive strip-anchoring arches 26, and in which the resilient strip 27 has no twisted or transversely sloping portions but bows freely upward between such a pair of pins so as to press these pins toward each other. With this arrangement, the bowing of a single portion of the presser strip over two adjacent upper pivot pins presses these pins toward each other in the common plane of the axes of these pins.

Moreover, I do not wish to be limited to the use of means for simultaneously urging the shutter blade members in more than one direction, since decided advantages over the now customary shutter blade mountings can be obtained by means which only prevent movements longitudinally of the blade members, namely in the direction in which such movements cause the loudest rattling when the blade axes are upright or approximately upright. For this purpose, the resilient or "hold-down" strip (or presser member) may be free of all twisted, embossed or transversely tilted portions, as shown for example by the resilient presser strip 28 of Fig. 8.

Nor do I wish to be limited to the providing of the needed resiliency in the presser member itself, since this member may be rigid and pressed against the pivot pins by auxiliary spring means. For example, Figs. 10 and 11 show portions of a shutter assembly in which the presser strip which rests on the upper pivot pins is a rigid bar 29 guided for vertical movement by riser posts 30, each of which posts has a head 31 spaced upwardly from the presser bar 29; and in which a compression spring 32 is interposed between each such post head 31 and the presser bar to urge the bar downwardly.

So also, I do not wish to be limited to the use of my invention in connection with shutters in which the blade axes extend vertically, since the operation of the recited features would to a large extent be the same if the pivot pins had horizontal axes and extended through horizontal bores in upright bars. Nor do I wish to be limited to details of the construction and arrangements above described, since further changes might be made without departing either from the spirit of my invention or from the appended claims.

With each of the illustrated embodiments, an ample spacing may be allowed between the outwardly directed shoulder faces of the peripheral flanges 4A and 5A on the pivot pins to permit considerable variations in the spacings of the perforated bars 6 and 7 through which these pins extend.

I claim as my invention:

1. In a shutter, two vertically spaced horizontal bearing bars provided with alined bores, upright shutter blade members each including two pivot pins extending respectively through alined bores in the said bars, and two means respectively supported by the two bearing bars and each engaging the tips of the pivot pins which extend through the adjacent bearing bar, one of the said means being fast with respect to the bearing bar adjacent thereto, and the other having its pin engaging portions continuously pressed toward the last named bearing bar.

2. In a shutter, two vertically spaced horizontal bearing bars provided with alined bores, upright shutter blade members each including two pivoting pins extending respectively through alined bores in the said bars, rigid supporting means fast with respect to the lower bearing bar and having the tips of the lower pivot pins seated thereon, and resilient means engaging the tips of the upper pivot pins for continually pressing the said upper pivoting pins downwardly.

3. In a shutter, two vertically spaced horizontal bearing bars provided with alined bores, upright shutter blade members each including two pivot pins extending respectively through alined bores in the said bars, rigid supporting means fast with respect to the lower bearing bar and having the tips of the lower pivot pins seated thereon, and resilient means engaging the tips of the upper pivoting pins for continually pressing the latter tips both downwardly and in the same direction transversely of the axes of the said pins.

4. In a shutter, two vertically spaced horizontal bearing bars provided with alined bores upright shutter blade members each including two pivot pins extending respectively through alined bores in the said bars, rigid supporting means fast with respect to the lower bearing bar and having the tips of the lower pivot pins seated thereon, and resilient means engaging the tips of the upper pivoting pins for continually pressing the latter tips both downwardly and in a direction at right angles to the general plane of the shutter blades when the shutter is closed.

5. A shutter assembly as per claim 4, in which the said rigid supporting means slope downward in the said same direction.

6. In a shutter, a plurality of shutter blade members each having oppositely directed pivot pins, two bearing members through which one and the other pin of each blade respectively extend, and two pressure-exerting strips respectively outward of the two bearing members, each strip having the free ends of one set of the pivot pins abutting against it, and means associated with one of the strips for yieldingly pressing its pin-engaging portions toward the other strip.

7. In a shutter, a plurality of shutter blade members each having alined pivot pins at its opposite end, two bearing members through which one and the other pin of each blade respectively extend, and two pressure-exerting strips respectively outward of the two bearing members, each strip having the one set of the said pins abutting against the strip face portions against which the two pins on each blade member respectively abut being disposed in surfaces converging toward each other transversely of the general common plane of the blade members when the shutter is closed.

8. In a shutter, two vertically spaced horizontal bearing bars provided with alined bores, upright shutter blade members each including two pivoting pins extending respectively through alined bores in the said bars, rigid supporting means fast with respect to the lower bearing bar and having the tips of the lower pivot pins seated thereon, a resilient strip engaging the tips of the upper pivot pins, and means flexing the strip downwardly at points spaced from the said upper pins.

9. In a shutter, two vertically spaced horizontal bearing bars provided with alined bores, upright shutter blade members each including two pivot pins extending respectively through alined bores in the said bars, rigid supporting means fast with respect to the lower bearing bar and having the tips of the lower pivot pins seated thereon, a resilient strip engaging the tips of the upper pivot pins, and means flexing the strip downwardly at points between each two of the said upper pins.

10. In a shutter, two vertically spaced horizontal bearing bars provided with alined bores, upright shutter blade members each including two pivot pins extending respectively through alined bores in the said bars, rigid supporting means fast with respect to the lower bearing bar and having the tips of the lower pivot pins seated thereon, a resilient strip engaging the tips of the upper pivot pins, and plural means fast with respect to the upper bearing bar for flexing the strip downwardly at points spaced from the said upper pins.

11. In a shutter, two vertically spaced horizontal bearing bars provided with alined bores, upright shutter blade members each including two pivot pins extending respectively through alined bores in the said bars, rigid supporting means fast with respect to the lower bearing bar and having the tips of the lower pivot pins seated thereon, plural stop elements fast with respect to the upper bearing member and presenting downwardly directed faces spaced from the said pins at a lower elevation than the tips of the upper pivot pins, and a resilient presser strip extending under the said stop elements and over the tips of the upper pivot pins.

12. A shutter construction as per claim 11, in which the said stop elements are the tops of arches alining in the common plane of the pivot axes of the shutter blade members.

13. A shutter construction as per claim 11 in which the said stop element faces are in a plane at right angles to the axes of the upper pivot pins, and in which the pin-engaging portions of the strip are all tilted at the same angle to the said plane.

14. In a shutter, two vertically spaced horizontal bearing bars provided with alined bores, upright shutter blade members each including two pivot pins extending respectively through alined bores in the said bars, rigid supporting means fast with respect to the lower bearing bar and having the tips of the lower pivot pins seated thereon, and resilient means engaging the tips of the upper pivot pins for continually pressing the latter tips both downwardly, the tips of the upper pivot pins being substantially pointed and the resilient means having concaved portions respectively engaging these pointed tips.

15. In a shutter, two vertically spaced horizontal bearing bars, bar-connecting means including a web fastened to the upper bearing bar, the two bars being provided with alined bores, upright shutter blade members each including two pivot pins extending respectively through alined bores in the said bars, a thrust bar fast with respect to the lower bearing bar and engaging the tips of the lower pivot pins, riser formations extending upwardly from the said webs between certain of the upper pivot pins, and a resilient strip extending under the said riser formations and over the tips of the upper pivot pins.

16. In a shutter, a plurality of shutter blade members each including a blade and two pins extending respectively from the ends of the blades, the pins on each blade being in alinement and having their axes in a common plane with the axes of the pins of other blades, two generally parallel pivoting members adjacent to the opposite ends of the blade members and each engaging the tips of all of the pins at one end of the blade members, and means associated with one of the pivoting members for yieldingly pressing the same toward the other pivoting member.

17. In a shutter, a plurality of shutter blade members each including a blade and two pins extending respectively from the ends of the blade, the pins on each blade being in alinement and having their axes in a common plane with the axes of the pins of other blades, two generally parallel pivoting members adjacent to the opposite ends of the blade members and each engaging the tips of all of the pins at one end of the blade members, means associated with one of the pivoting members for yieldingly pressing the same toward the other pivoting member, and means associated with both pivoting members for causing the said pressure to urge each of the blade members also in a direction radially of the axis of its pins.

18. A shutter construction as per claim 17, including two stop members respectively adjacent to the pins at opposite ends of the blade members for limiting the movements of the blade members in the said radial direction.

19. In a shutter, two parallel bars each provided with parallel bores spaced longitudinally of the bar, the bores in the two bars alining with each other and all having their axes in a common plane; means rigidly spacing the bars; shutter blade members each including a blade and two alined pins extending outwardly from opposite ends of the blade, each pin extending through one of the said bores and being of smaller diameter than that bore, and each pin having a radial shoulder facing and freely spaced from the bar having the bore through which that pin extends; two pin-engaging means respectively outward of and adjacent to one of the said bars and each engaging the tips of the pins extending through the bores in the bars adjacent thereto, one of the pin-engaging means being fast with respect to the adjacent bar; and means associated with the other pin-engaging means for causing the latter to exert a pressure toward the aforesaid bar on the pins engaged by the said other bar.

Signed at Cleveland, Ohio, May 7, 1931.

LEE B. GREEN.